United States Patent

Horonick et al.

[15] 3,678,151
[45] July 18, 1972

[54] BIOLOGICAL STAINING METHOD

[72] Inventors: Andrew Horonick; Andre V. Munschy, both of Bronx, N.Y.

[73] Assignee: Gugol-Clini-Tex, Inc., New York, N.Y.

[22] Filed: July 25, 1969

[21] Appl. No.: 845,089

Related U.S. Application Data

[63] Continuation-in-part of Ser. No. 562,487, July 5, 1966, abandoned.

[52] U.S. Cl. ..................... 424/3, 23/230 B, 252/408, 424/7
[51] Int. Cl. ........................... G01n 1/30, G01n 33/16
[58] Field of Search ....................... 424/3, 7; 252/408

[56] References Cited

UNITED STATES PATENTS

| | | | |
|---|---|---|---|
| 2,992,971 | 7/1961 | Millman | 424/3 |
| 3,053,255 | 9/1962 | Meyer | 128/268 |
| 3,075,527 | 1/1963 | Bechtold | 128/260 |
| 3,138,533 | 6/1964 | Heim | 428/329 |
| 3,359,072 | 12/1967 | Rey | 23/230 |
| 3,495,926 | 2/1970 | Naz | 424/3 |

FOREIGN PATENTS OR APPLICATIONS

| | | | |
|---|---|---|---|
| 831,804 | 3/1960 | Great Britain | 23/253 |
| 135,829 | 10/1902 | Germany | 424/7 |

OTHER PUBLICATIONS

Lillie, Histopath. Tech. & Practical Histochem. The Blakiston Div., McGraw-Hill, N.Y., 1965, pp. 585–588.

Primary Examiner—Albert T. Meyers
Assistant Examiner—Anna P. Fagelson
Attorney—Sandoe, Hopgood & Calimafde

[57] ABSTRACT

The invention relates to preparation of precise micro and other values of volumetric concentrations of chemicals, standards, reagents, pharmaceuticals and biologicals in solvents therefor and utilizes dry segments from an inert, integrally divisible and absorbent carrier uniformly impregnated with said substances, each of the segments carrying a computed quantity of the impregnation based on the proportionate size with respect to the carrier. One of the objects of the invention is in the preparation and utilization of segments as dry stain or dye strips for formation of liquid stains applicable to biological materials such as blood smears and bacteria for staining and microscopic examination purposes.

2 Claims, No Drawings

BIOLOGICAL STAINING METHOD

The invention herein is a continuation-in-part of our invention in our copending application U.S. Ser. No. 562,487 filed July 5, 1966, now abandoned.

This invention relates generally to premeasured biological standards, reagents, controls, chemicals and pharmaceuticals including organic compositions and dyes; and has for objects procedure for quantitative preparation thereof by impregnation in and subdividing absorbing carriers therefor.

More particularly, the invention has as an object the dispensing quantitatively of micro, trace, and other amounts of chemicals, standards, reagents, medicines, pharmaceuticals, dyes, and the like by incorporating said substances (when capable of being reduced to dry form) in inert carriers and then subdividing the carriers whereby computable quantities of said substances are dispensable by the subdivisions.

As to standards, reagents, chemicals, dyes and controls as prepared in clinical laboratories, they are customarily provided for use in liquid form and are dispensed in accurately measured volumes. However, such compositions are not stable for long periods of time, must be refrigerated or else continually prepared afresh before use.

The known method used to overcome such shortcomings of unstable standards, reagents, dyes and controls is to package these products in powder form accurately weighed out, and then before use to be diluted to fluid form as is the procedure with lyophilized control serums and thromboplasteins which are reconstituted. This method, however, involves a high processing cost and a high margin of wastage; for when the powder is dissolved and diluted, only a small portion is used immediately and the remainder spoils and is no longer useable within a day or two.

The invention has a particular application to quantitative form, utilization and administration of medicines, drugs, and dyes.

As a further object, the invention embraces a composition of matter comprising a segment of an accurately divisible, inert, and absorbent carrier and containing a deposition of one or more substances in dry from, the quantity of said deposition being a function of the dimensional division of the carrier.

To overcome present shortcomings in the preparation and use of chemicals including biologicals and dyes, which by nature are unstable or which involve difficulties both physical and economic in preparation and application, the invention has an object a procedure for and product formation therefrom for increasing the stability and ease of application of said chemicals to be diluted as by (1) having distributed in an absorbent inert carrier premeasured quantities of the selected substance or substance in dry form; (2) cutting said carrier mathematically into divisions to arrive at premeasured quantities in each such division; and (3) placing the carrier division or divisions in conventional applicable diluents for the active ingredients such as water, saline, organic solvent, blood serum and whole blood and other biological fluids. Within a brief time, a definite solution with a defined concentration is ready for use. Among the agents involved are serum proteins, hemoglobin and hematin, heparin, pyruvic acid, glucose, urea, ascorbic acid, carotene, fibrogen, vitamin A or vitamin combinations, calcium, chlorides, cholesterol, and cholesterol esters, creatinine, phosphorous, lipase, amylase, acid and alkaline phosphatase, serum trausamines, etc. Agents such as carotene, vitamin A and cholesterol require organic diluents.

To overcome shortcomings of present preparations for consumption in premeasured and ingestable dry form, the same procedure is followed as set forth in the preceding paragraph except that the diluent is afforded by the body's physiology.

The method of preparing premeasured quantities of stable standards including reagents, controls, dyes for staining biologicals, indicators, enzymes and the like, and other biologicals and chemicals used for human consumption in dry form is as follows.

An absorbent inert carrier such as cellulose, cellulosic derivatives, glass cloth, asbestos cloth, and other fibers is used as an effective combined vessel and carrier for a required concentration of one or more of the said substances in solution form, and the diluent is then evaporated from said carrier. Thereafter, the carrier having the active ingredients distributed therein in dry from form may be subdivided mathematically and concentration-wise into a plurality of forms and shapes or into compressed tablets depending both upon the particular material of the carrier and the use to which it is to be put. The user will thus have available measured micogram and milligram or other quantities of any agent or substance or combinations in which he is interested. Moreover, the prepared strips and tablets of said substances or combinations maintain the chemicals in stable form in a non-humid environment for an indefinite period of time without refrigeration requirements; and as to those substances sensitive to light and other rays, suitable shields therefor in containers may be provided.

As to the substances requiring liquid dilution before use, one or more of the impregnated dry carrier units is immersed in a given or selected quantity of diluent or leaching fluid such as water, saline, organic solvent, blood serum, whole blood and other biological fluids for a few minutes for leaching purposes, and then any test procedure may be begun. Utilization of said units for staining blood or bacteria in the form of staining strips will hereinafter be described.

As to the substances for human intake orally in dry form, the impregnated dry carrier units alone are used but in such cases the carrier composition should be of ingestable substances without deleterious effects and even glass cloth and asbestos cloth as mentioned could be utilized.

When needed for laboratory use in liquid form, the dry carrier units impregnated with the selected premeasured active ingredient or ingredients are suspended in a menstrum of diluent such as the aforestated water, saline, blood serum and other biological fluids and organic solvents, and after a brief leaching time, the user has a solution of the substance ready for use and manipulation. This eliminates measuring out of powders on a balance. For example, if 0.3 mg. of phosphorous in 5 ml. of diluent is required, an impregnated carrier unit of 0.3 mg. is immersed in 5 ml. of diluent, and after a brief period of leaching, the user has his requirements. Moreover, solutions of double, triple and quadruple concentration can be prepared just as easily merely be increasing the number of units proportionally.

The carriers preferably are in disc form or cut-outs therefrom although strip or other forms as mentioned can be used also. Discs will range in diameter from 5 mm. to 25 mm. and in thickness from 0.005 in. to 0.10 in. The stabilized active ingredients in each disc can range in amount from traces to necessary amounts. Combinations of ingredients may vary in number up to 20.

The user will thus have available microgram and milligram quantities as well as larger quantities exactly measured of any substance or combination of substances in which he is interested. Use of the invention in connection with the compositions requiring leaching will obviate the need to purchase a microbalance and will save the operator 15 to 30 minutes to a half day of actual working time in addition to effecting cost economies in use of the materials; while use of the invention in connection with the formation of pills, vitamins and other compositions taken orally together with the carrier and in dry form assures both the user and manufacturer exact premeasured quantity, stability and freshness and economy in cost both to manufacturer and consumer.

Below are typical examples for preparation and products of the invention and are applicable also to compositions used for oral intake in dry form as aforedescribed.

HEMOGLOBIN STANDARD AND CONTROL

Outdated bank blood was placed in a jar and a strip of filter paper—pure cellulose—obtained from the Whatman Filter Paper distributor, Reeves Angel, New Jersey, was slowly drawn through the well mixed blood. The coated paper was suspended above a hot plate and the rising warm air dried the strip within an hour.

A paper punch with a ¼ in. die was used to punch out discs from the coated strip.

The circles were then suspended in Drabkin's solution (used generally for hemoglobin determination) and within 15 minutes, readings were begun on a colorimeter with the following results.

| Tube | No. of Discs | Reading | | |
|---|---|---|---|---|
| 1) | 1 | 62 | 63 | 63 |
| 2) | 2 | 119 | 122 | 118 |
| 3) | 3 | 180 | 182 | 176 |
| 4) | 4 | 226 | 224 | 220 |
|  |  | (11/29/65) | (12/1/65) | (12/10/65) |

GLUCOSE STANDARD AND CONTROL

Three solutions were prepared in 100 ml. of water each as follows:

1) 90 mg. uric acid
   1500 mg. glucose 2) 90 mg. uric acid
   1500 mg. glucose
   1000 mg. urea 3) 90 mg. uric acid
   1500 mg. glucose
   1000 mg. urea
   250 mg. potassium dihydrogen phosphate.

Discs were prepared as before for hemoglobin. Glucose was then determined using the Folin Wu method. Each disc contains the same amount of glucose and should give the same readings.

| Tube | Items | Reading |
|---|---|---|
| 1) | 2 Discs Soln 1 | 232 |
| 2) | 2 Discs Soln 1 | 238 |
| 3) | 2 Discs Soln. 2 | 230 |
| 4) | 2 Discs Soln. 2 | 238 |
| 5) | 2 Discs Soln 3 | 230 |
| 6) | 2 Discs Soln 3 | 230 |

The invention herein further encompasses novel staining strips, preparation and novel utilization thereof in connection with staining biological specimens such as dried-out blood smears, heat-fixed bacteria and tissue for microscopic examination on slides.

Presently, procedure follows a wet process involving the pouring of a dye over the specimen such as used in applying the Wright's Stain comprising Methylene Blue and Eosin for microscopic examination of white blood cells. Thus one pours a proper mixture of liquid dye and buffer over the specimen. After a wait of about 2 to 4 minutes for fixation in the case of the said blood smear, an equal volume of aqueous buffer such as 2 cc of a phosphate buffer is poured over said specimen at which time staining begins. After a further wait of 4 to 6 minutes, the excess of dye and buffer is decantered and the slide is rinsed under tap water or buffer (for maintenance of necessary pH). Thereafter, the slide is dried under ambient conditions and is then ready for microscopic examination.

The drawbacks of the procedure above outlined frequently involves the deterioration of the liquid dye or mixture when same is stored in a bottle on the shelf such as by formation of formaldehyde and formic acid from the methyl alcohol solvent. Furthermore overstaining and understaining may occur because of difficulty in maintaining proper volume of either dye or stain and buffer or equal volumes of buffer and dye or stain because of run-off and spillage from the slide; overstaining and understaining also occur when the time period of the fixing and buffer stages are not held within proper limits. If there is undertiming, the specimen is understated; and if there is overtiming, the specimen is overstained. With overstaining, a precipitate develops on the specimen. In either case, differentiability of the the white blood cells under the microscope is impaired. Under present procedures there is poor reproduceability of specimens from the same blood-smear and the operations are messy. As to poor reproduceability, if the quantitative and timing factors above described are not maintained in value, the reproduceability of staining will be variable; and with such different stainings, different judgments from microscopic examination of similar specimens will be made. However, in the case of bacteria and tissue staining, timing is not too important, but the element of messiness involved in the procedure still applies.

The above shortcomings involved in the staining of biological specimens are overcome by the structure and application of dry segments or strips impregnated as mentioned in this specification but as specifically related to dyes for formation of stain strips and utilization thereof as will hereinafter appear.

STAINING STRIPS FOR BIOLOGIC SPECIMENS

In the production of typical strips for staining white blood cells from specimens of blood-smears, we use chemically pure Whatman filter paper No. 1 in roll or strip form for impregnation with a mixture found suitable and in following proportions.

| | |
|---|---|
| Eosin Y | 1 gram |
| Methylene Blue | 1 gram |
| Azure A | 0.6 gram |
| Methylene Violet | 0.2 gram |
| Methyl Alcohol | 250 ml. |

Above formulation is subject to minor modifications.

A solution of the above ingredients in said methyl alcohol is prepared in a vessel and the paper is saturated therewith by passage therethrough. As the paper emerges from the bath it is suitably dried by evaporation as by passage through a hot air chamber. Thus, a long strip or roll of dried impregnated paper results and the impregnation is homogeneously and evenly distributed throughout.

The impregnated paper is then cut into suitably sized segments such as seven eighths by 1½ inches. Since both the total area of the paper prior to impregnation and the quantity of ingredients of the saturating solution are known, the quantity of dye in any segmented piece is arrived at by calculation. Each of the same-sized segments thus carries the proper, known and equal quantity of dye for staining purposes. There are no errors and problems due to spillage. The strips are suitably packaged in boxes and stored and sold in dry form.

In the utilization of the prepared staining strips, each is suitably grasped and dipped into a methyl alcohol solution of a catalyst. The catalyst enables the stain to go into solution in alcohol. For when the alcohol is evaporated in the formation of the strips, the paper for some reason affects the function of dye stainability. Therefore, the alcoholic solution containing the catalyst restores or augments dye stainability. The catalyst mixture as used consists of a 1 percent methyl alcohol solution of glycerol. Alternative mixtures may be a 1 percent methyl alcohol solution of propylene glycol or methyl alcohol with a trace of chlorophyl.

The dry strip is immersed into the catalyst alcohol solution for 1–3 seconds until saturated, then withdrawn and placed over the dry blood-smear on the slide to which said strip adheres for a period of from 20–90 seconds. Thereafter, the strip is peeled off and discarded. The slide is then rinsed in a suitable buffer solution such as a phosphate buffer with pH 6.6–6.8.

After the slide is thus rinsed, it is permitted to dry under ambient conditions for about 2–4 minutes, and thereafter the slide is ready for microscopic examination.

The actual staining step according to the above strip procedure takes between about 20–90 seconds whereas under conventional procedure of staining, the operation consumes from between 6–10 minutes with the incidental faults of under and over-staining, variations in reproduceability and messiness of procedure.

Bacteriological stains such as Acid Fast and Gram's Stain and tissue stains in dry strip form are similarly prepared from methyl alcohol solutions of dyes. As is known, there are a number of different dyes or stains used for specific bacteria and tissue types. Among such dyes or stains available are solutions of 20 percent Basic Fuchsin; 2 percent Crystal Violet; 2 percent Brilliant Green; 2 percent Methylene Blue; 2 percent Acid Green. However, there is a wide latitude in formula concentrations.

In the utilization of the bacterial and stain strips, the dry-strip is placed over the specimen, a few drops of methyl alcohol or water is added on to the strip causing adherence, and after 1 or 2 minutes, the strip is peeled off, the slide rinsed in tap water, suitably dried and the stained specimen on the slide is then ready to be viewed under the microscope.

The phosphate buffer above mentioned and employed in the process utilizing the dry staining strips to stain the white blood cells may also be similarly produced in the form of dry strips by utilizing aqueous 0.2 molar solution of a phosphate, citrate, tartrate or borate bath. The paper is run therethrough, dried, segmented and ready for use. Each segment of such prepared strip submerged in 100 cc of water will yield a buffer solution of the desired pH.

Thus has been described a novel product, a novel method of production thereof and novel procedures in utilization in connection with providing divisions of an accurately divisible, inert and absorbent carrier containing a uniformly dispersed deposition of substances in dry form for transfer thereof into solution for staining and other purposes, the quantity of said deposition in the divisions being a function of the proportionate size thereof with respect to the carrier.

We claim:

1. A method of staining a biological specimen on a slide for microscopic examination using a microbiological dye-staining strip system which comprises,
   a. providing a first dry strip of uniformly dimensioned inert fibrous material uniformly impregnated with a predetermined amount of dye-stain selective to said specimen,
   b. wetting said strip with a catalyst comprising an alcoholic solution and applying said strip to said specimen thereby transferring the dye thereto to produce the desired stain, the catalyst solution being selective to said stain being employed to augment the stainability of said specimen,
   c. removing the strip from the stained specimen,
   d. providing another dry strip of uniformly dimensioned inert fibrous material uniformly impregnated with a predetermined amount of a soluble buffer material selective to said stain produced by said first strip, and
   e. causing the buffer solution produced from said second strip to contact the stained specimen.

2. The method of claim 1, wherein the dye-stain in the first dry strip is a Wright's Stain.

* * * * *